United States Patent
Arakawa et al.

(10) Patent No.: US 7,033,566 B2
(45) Date of Patent: Apr. 25, 2006

(54) PHOTOCATALYST AND USE THEREOF FOR DECOMPOSING CHEMICAL SUBSTANCE

(75) Inventors: Hironori Arakawa, Tsukuba (JP); Zhigang Zou, Tsukuba (JP); Kazuhiro Sayama, Tsukuba (JP)

(73) Assignee: National Institute of Advanced Industrial Science and Technology, Tokyi (JP)

( * ) Notice: Subject to any disclaimer, the term of this patent is extended or adjusted under 35 U.S.C. 154(b) by 416 days.

(21) Appl. No.: 10/190,574

(22) Filed: Jul. 9, 2002

(65) Prior Publication Data
US 2003/0017702 A1 Jan. 23, 2003

(30) Foreign Application Priority Data
Jul. 10, 2001 (JP) ............... 2001-208937

(51) Int. Cl.
*C01G 15/00* (2006.01)
*C01G 53/00* (2006.01)
*C01G 35/00* (2006.01)
*C01G 33/00* (2006.01)
*C01G 37/00* (2006.01)

(52) U.S. Cl. .................. 423/595; 423/599; 423/594.1; 423/594.3; 423/594.5; 423/594.8; 423/240 R; 423/235; 423/244.06; 423/230; 423/245.1; 423/657; 502/307; 502/311; 502/312; 502/313; 502/314; 502/315; 502/316; 502/318; 502/319; 502/324; 502/325; 502/326; 502/327; 502/331; 502/332; 502/335; 502/336; 502/337; 502/338; 502/342; 502/343; 502/346; 502/355; 204/157.5; 204/157.52

(58) Field of Classification Search ................ 423/595, 423/599, 594.1, 594.3, 594.5, 594.8, 659, 423/240 R, 235, 244.06, 230, 657, 245.1; 502/307, 311–316, 318, 319, 324–327, 331, 502/332, 335–338, 342, 343, 346, 355; 204/157.5, 204/157.52
See application file for complete search history.

(56) References Cited

OTHER PUBLICATIONS

Zou, et al., "Photocatalytic behavior of a new series of . . . in aqueous solutions," Sep. 2001, Catalysis Letters, 75(3-4), pp. 209-213.*
Zou, et al., "Photocatalytic hydrogen and oxygen formation under visible light irradiation . . . photocatalysts," Jun. 2002, J. of Photochemistry and Photobiology, A: Chemistry, 148(1-3), pp. 65-69.*
Zou, et al., "Effect of Ni substitution on the structure and photocatalytic activity of . . . light irradiation," Jun. 2002, J. of Materials Research, 17(6), pp. 1419-1424.*

* cited by examiner

*Primary Examiner*—Steven Bos
(74) *Attorney, Agent, or Firm*—Bacon & Thomas, PLLC

(57) ABSTRACT

A photocatalyst including a metal oxide semiconductor represented by the formula:

$$In_{1-x}M_xAO_4$$

wherein M represents a transition metal element, A represents an element belonging to the Group 5a of the Periodic Table and x is a number greater than 0 but smaller than 1.

10 Claims, No Drawings

PHOTOCATALYST AND USE THEREOF FOR DECOMPOSING CHEMICAL SUBSTANCE

BACKGROUND OF THE INVENTION

This invention relates to a photocatalyst having visible light activity and a method of photo-decomposition of a chemical substance by irradiation of light using the photocatalyst.

In recent years photocatalysts are attracting much attention for the production of oxygen and hydrogen from water. Utilization of photocatalysts as an environmental clarification material for removing malodors and for decomposing harmful substances or pollutants in air or water has been also researched extensively. In the case of photo-decomposition of water, an energy-accumulating reaction $$H_2O \rightarrow H_2 + 1;2O_2$$

proceeds according to the following photocatalytic mechanism. Thus, when the photocatalyst is irradiated with light having greater than the band gap energy thereof, electrons having strong reducing action and holes having strong oxidizing action are formed. The strong reduction power of the electrons and the strong oxidation power of the holes generated by the optical excitation are utilized for the decomposition of water.

For an industrial scale process for the production of oxygen and hydrogen using a photocatalyst, utilization of sunlight is essential. The intensity of sunlight is the strongest at a wavelength of about 500 nm. A visible light region of sunlight accounts for about 43% of the total solar energy, while only about 5% of the solar energy is attributed to an ultraviolet region. In order to effectively utilize the solar energy, therefore, it is essential to use a photocatalyst having visible light activity.

One well known photocatalyst is titanium oxide. The titanium oxide photocatalyst, however, needs ultraviolet rays having wavelength 400 nm or less as the excitation light and has low visible light activity.

SUMMARY OF THE INVENTION

It is a prime object of the present invention to provide a photocatalyst which allows for the photocatalytic reactions by irradiation of not only ultraviolet but also visible light.

Another object of the present invention is to provide a photocatalyst which is useful for photochemicaly decomposing chemical substances.

It is a further object of the present invention to provide a method of producing hydrogen and oxygen from water, a method of removing malodor gases, and a method of decomposing harmful substances contained in a gas or liquid such as air or water.

In accomplishing the foregoing objects, the present invention provides a photocatalyst comprising a metal oxide semiconductor represented by the following formula (1):

$$In_{1-x}M_xAO_4 \tag{1}$$

wherein M represents a transition metal element, A represents an element belonging to the Group 5a of the Periodic Table and x is a number greater than 0 but smaller than 1.

The metal oxide semiconductor of the above formula (1) can absorb UV rays and visible light more efficiently as compared with a metal oxide semiconductor of $InAO_4$ where A is as defined above. The positive holes of the valence band of the metal oxide semiconductor of the formula (1), which are generated by irradiation of light, have strong oxidation power and can oxidize various electron donating materials, such as water and organic compounds, that are present on the surfaces of the photocatalyst. The electrons of the conduction band may be consumed by reducing oxygen in air. Namely, the conduction band level of the photocatalyst of the present invention is energetically more negative than that of the reduction level of oxygen. Thus, the photocatalyst of the present invention has a sufficient reduction potential which can generate hydrogen and reduce oxygen. Therefore, the photocatalyst of the present invention is quite useful as the photocatalyst for hydrogen production, water splitting to hydrogen and oxygen, and decomposition of organic contaminants as well as wastes.

The present invention also provides a method of decomposing a chemical substance, which comprises irradiating the chemical substance with light in the presence of the above photocatalyst.

Other objects, features and advantages of the present invention will become apparent from the detailed description of the preferred embodiments of the invention to follow.

DETAILED DESCRIPTION OF THE PREFERRED EMBODIMENTS OF THE INVENTION

A photocatalyst according to the present invention comprises a metal oxide semiconductor represented by the following formula (1):

$$In_{1-x}M_xAO_4 \tag{1}$$

wherein M represents a transition metal element, A represents an element belonging to the Group 5a of the Periodic Table and x is a number greater than 0 but smaller than 1. The metal oxide semiconductor of the formula (1) is an oxide of $InAO_4$ in which part of In is substituted with a transition metal element M.

Any element may be used as the transition metal element M as long as it can be stably present in the form of a trivalent state on average. Not all M is required to be trivalent; i.e. part of M may be divalent and tetravalent as long as M as a whole is trivalent. Further, while the element M is ideally trivalent on average, the valency of M is not necessarily precisely 3 when a lattice defect exists. Illustrative of suitable transition elements M are Cr, Mn, Fe, Co, Ni, Cu and Zn and A.

The element A belonging to the Group 5a of the Periodic Table is preferably at least one metal selected from the group consisting of Nb, Ta and V. The number x is greater than 0 but smaller than 1, preferably greater than 0 but smaller than 0.5. While the number of oxygen atoms is shown as being 4 in the formula (1), the number is not necessarily 4 when oxygen defect exists. When the proportion of the transition metal element M is high, namely when x is large, oxygen defect generally increases.

For reasons of easy movement of electrons in the metal oxide semiconductor, the metal oxide semiconductor of the formula (1) preferably has a wolframite crystal structure of a monoclinic system in which regular octahedra constitute a layer structure.

Especially preferred metal oxide semiconductor from the standpoint of electron movement and active cites is represented by the following formula (2) or (3):

$$In_{1-x}Ni_xTaO_4 \tag{2}$$

$$In_{1-x}Ni_xNbO_4 \tag{3}$$

wherein x is a number greater than 0 but smaller than 0.5.

The metal oxide semiconductor of the formula (1) may be prepared by, for example, mixing indium oxide, an oxide of the element M and an oxide of the element A in amounts providing a composition having metal constituents of the metal oxide semiconductor in a stoichiometry nearly equal to the stoichiometry of the metal oxide semiconductor. The mixture is then calcined in air at a temperature for a period of time sufficient to produce $In_{1-x}M_xAO_4$. When the raw material metal compounds have a tendency to sublime, such compounds are used in a stoichiometricaly excess amount. Other methods such as a sol-gel method using metal alkoxides or metal salts and a method using metal complex polymerization may also adopted.

The metal oxide semiconductor obtained above may be used as a photocatalyst as such. Since the photocatalyst has a higher light absorbing efficiency as the surface area thereof increases, it is preferred that the metal oxide semiconductor thus obtained be ground by any suitable pulverizer such as a ball mill to a particle size of 200 mm or less, more preferably 50 mm or less. The lower limit of the particles is not specifically limited but is generally about 10 nm (0.001 μm). If desired, the metal oxide semiconductor particles may be molded into a desired shape such as a plate.

Various modifications generally adopted to the conventional photocatalysts may be made for the metal oxide semiconductor of the present invention. One such modification is to support co-catalyst onto the metal oxide semiconductor photocatalyst. Any known co-catalyst may be used for the purpose of the present invention. Examples of the co-catalyst include a noble metal such as Pt and Rh, a transition metal such as Ni and metal oxides such as $IrO_2$, $NiO_x$ and $RuO_2$. The co-catalyst may be supported on the metal oxide semiconductor by any suitable known method such as impregnation or photodeposition method. In the case of impregnation, the metal oxide semiconductor is immersed in an aqueous solution of salt (e.g. chloride or nitrate) or complex of the metal species of the co-catalyst. The impregnated semiconductor is then dried at 100 to 200° C. for 2 to 5 hours and calcined at a temperature of 800° C. or less, preferably 200 to 500° C., in an oxidizing or reducing atmosphere. The amount of the co-catalyst is generally 0.01 to 10% by weight, preferably 0.1 to 5% by weight, based on the total weight of the metal oxide semiconductor and the co-catalyst.

The photocatalyst according to the present invention may be utilized for various applications for which conventional photocatalysts have been hitherto used, such as production of hydrogen from water, removal of malodor gases in air, decomposition of harmful substances contained in water or air or deposited on solid surfaces, and photochemical reactions.

In a method for the production of hydrogen from water, the water is irradiated with light in the presence of the photocatalyst. The water may be pure water or may contain a salt, such as carbonate, bicarbonate, iodide or bromide, as in the case of the electrolysis of water. The photocatalyst may be used in any desired form. For example, the photocatalyst may be suspended or dispersed in the water, rested on a suitable support placed in the water, or immersed in the form of a fixed layer in the water. The amount of the catalyst may be determined so that incident light may be efficiently absorbed by the photocatalyst. Generally, the photocatalyst is used in an amount of 0.05 to 10 g, preferably 0.2 to 3 g, per 25 $cm^2$ of an irradiation area. When pure water is used, the irradiation of the water with light in the presence of the photocatalyst results in decomposition thereof into hydrogen and oxygen in a molar ratio of hydrogen/oxygen of 2:1.

In a method of decomposing harmful substances including a malodor gas contained in a gas or liquid, the gas or liquid containing the harmful substances is irradiated with light in the presence of the photocatalyst, so that the harmful substances are decomposed into harmless state. In the photocatalytic reaction, the harmful substances serve to act as an electron donor and is oxidized and decomposed by the positive holes generated by the irradiation of the photocatalyst with light. The electrons generated by the irradiation cause the formation of hydrogen or reduction of oxygen depending upon the reaction environment. In the case of decomposition of malodor or harmful gases, the reaction is suitably performed in a gas phase, in which the photocatalyst may be supported on a suitable support or fixed in the form of a layer or bed. In the case of decomposition of harmful substances contained in a liquid, the liquid is irradiated with light in the presence of the photocatalyst. The photocatalyst may be used in any desired form. For example, the photocatalyst may be suspended or dispersed in the liquid, rested on a suitable support placed in the liquid, or immersed in the form of a fixed layer in the liquid.

The harmful substances to be decomposed may be, for example, $NO_x$, $SO_x$, fluorocarbons, ammonia gas, hydrogen sulfide, alcohols, aldehydes, amines, mercaptans, aromatic hydrocarbons (e.g. benzene, toluene and xylene), phenol compounds, agricultural chemicals (e.g. herbicides, bactericides and pesticides), cyan compounds, sulfur compounds, germs (e.g. coliform bacteria and staphylococcus), fungi, algae, oils and nicotine tars.

The light used for these photocatalytic reactions can have wavelengths ranging from ultraviolet to visible, but can also be ultraviolet light alone as well as visible light alone. The reaction systems may also be irradiated with light of a specific wavelength selected from the ultraviolet to visible regions. As long as light from the ultraviolet to visible light region is included, light in other wavelength regions such as far ultraviolet or infrared light may be present. The light sources may be, for example, sunlight, fluorescent lamp, black light, mercury lamp and xenon lamp.

The following examples will further illustrate the present invention.

EXAMPLE 1

A metal oxide semiconductor of the formula $In_{0.95}Ni_{0.05}TaO_4$ was prepared from stoichiometric amounts of $In_2O_3$, NiO and $Ta_2O_5$ as raw materials. Thus, 3.801 g of $In_2O_3$, 0.108 g of NiO and 6.368 g of $Ta_2O_5$ were placed in a crucible and pre-calcined at 900° C. for 24 hours in air. The pre-calcined product was further calcined at 1,200° C. for 50 hours in air three times in total. The calcined mass was ground into particles having a diameter of 10 mm or less. The thus obtained product was measured for X-ray diffraction (XRD) and scanning electron microscopy with energy dispersive spectroscopy (SEM-EDS) and calculation was made by the Rietveld method. As a result, the product was found to be a metal oxide semiconductor $In_{0.95}Ni_{0.05}TaO_4$ having a monoclinic crystal structure, a space group of P2/C and a layer wolframite crystal type. A semiconductor with a wolframite crystal structure is known to have such a structure that electrons can move relatively easily. Further, UV-visible absorption spectroscopy revealed that the band gap was less than 2.5 eV and that the semiconductor had visible light activity.

The metal oxide semiconductor of the formula $In_{0.95}Ni_{0.05}TaO_4$ was impregnated with an aqueous solution of $Ni(NO_3)_2$, dried at 200° C. for 5 hours, reduced by treatment in the atmosphere of hydrogen at 500° C. and then oxidized by treatment in the atmosphere of oxygen at 200° C., thereby obtaining $NiO_x$-supported semiconductor $NiO_x/In_{0.95}Ni_{0.05}TaO_4$ (Photocatalyst 1) having $NiO_x$ content of 1.0% by weight.

EXAMPLE 2

Example 1 was repeated in the same manner as described except that amounts of the raw materials $In_2O_3$, NiO and $Ta_2O_5$ were changed, thereby obtaining a metal oxide semiconductor of the formula $In_{0.9}Ni_{0.1}TaO_4$. On this semiconductor was supported $NiO_x$ in the same manner as that in Example 1 to obtain supported semiconductor $NiO_x/In_{0.9}Ni_{0.1}TaO_4$ (Photocatalyst 2) having $NiO_x$ content of 1.0% by weight.

EXAMPLE 3

Example 1 was repeated in the same manner as described except that amounts of the raw materials $In_2O_3$, NiO and $Ta_2O_5$ were changed, thereby obtaining $NiO_x$-supported semiconductor $NiO_x/In_{0.85}Ni_{0.15}TaO_4$ (Photocatalyst 3) having $NiO_x$ content of 1.0% by weight.

EXAMPLE 4

Example 1 was repeated in the same manner as described except that $RuO_2$ was used as a co-catalyst. Thus, the metal oxide semiconductor of the formula $In_{0.95}Ni_{0.05}TaO_4$ was impregnated with an aqueous solution of $RuCl_4$, dried at 200° C. for 5 hours and then calcined in the atmosphere of oxygen at 500° C. for 2 hours, thereby obtaining $RuO_2$-supported semiconductor $RuO_2/In_{0.95}Ni_{0.05}TaO_4$ (Photocatalyst 4) having $RuO_2$ content of 1.0% by weight.

EXAMPLE 5

Example 2 was repeated in the same manner as described except that $RuO_2$ was used as a co-catalyst, thereby obtaining $RuO_2$-supported semiconductor $RuO_2/In_{0.9}Ni_{0.1}TaO_4$ (Photocatalyst 5) having $RuO_2$ content of 1.0% by weight.

EXAMPLE 6

Example 3 was repeated in the same manner as described except that $RuO_2$ was used as a co-catalyst, thereby obtaining $RuO_2$-supported semiconductor $RuO_2/In_{0.85}Ni_{0.15}TaO_4$ (Photocatalyst 6) having $RuO_2$ content of 1.0% by weight.

Comparative Example 1

$InTaO_4$ was prepared from $In_2O_3$ and $Ta_2O_5$ as raw materials in a manner similar to that of Example 1. A co-catalyst $RuO_2$ was then supported on $InTaO_4$ to obtain $RuO_2$-supported semiconductor $RuO_2/InTaO_4$ (Comparative Photocatalyst 1) having $RuO_2$ content of 1.0% by weight.

Each of Photocatalysts 1 through 6 and Comparative Photocatalyst 1 obtained above was tested for the water decomposition efficiency. Thus, each photocatalyst (0.5 g) was suspended in 250 ml of pure water contained in a closed, circulation type catalytic reaction device provided with a reactor cell made of pylex glass. While stirring the suspension using a magnetic stirrer and while circulating the suspension, the reactor cell was irradiated with light from a 300 W xenon lamp through a cut-off filter permitting transmission of light of a wavelength of 420 nm or higher. The gas produced by the reaction was analyzed by gas chromatography. The results are summarized in Table 1.

TABLE 1

| Photo-catalyst | Composition | Wavelength of Irradiated Light | Gas Production Rate (μmol/h) | |
|---|---|---|---|---|
| | | | $H_2$ | $O_2$ |
| 1 | $NiO_x/In_{0.95}Ni_{0.05}TaO_4$ | >420 nm | 4.2 | 2.1 |
| 2 | $NiO_x/In_{0.9}Ni_{0.1}TaO_4$ | >420 nm | 17.0 | 8.1 |
| 3 | $NiO_x/In_{0.85}Ni_{0.15}TaO_4$ | >420 nm | 8.3 | 4.1 |
| 4 | $RuO_2/In_{0.95}Ni_{0.05}TaO_4$ | >420 nm | 2.0 | 1.0 |
| 5 | $RuO_2/In_{0.9}Ni_{0.1}TaO_4$ | >420 nm | 8.7 | 4.3 |
| 6 | $RuO_2/In_{0.85}Ni_{0.15}TaO_4$ | >420 nm | 4.8 | 2.3 |
| Comp. Pc. 1 | $RuO_2/InTaO_4$ | >420 nm | 0.75 | 0.35 |

From the results shown in Table 1, it will be appreciated that with the use of photocatalysts composed of a metal oxide semiconductor $In_{1-x}M_xAO_4$ on which a co-catalyst is supported water is decomposed into hydrogen and oxygen with a molar ratio of hydrogen/oxygen of 2:1 at a high rate by irradiation of visible light (>420 nm). The visible light activity of the photocatalyst used in Comparative Example 1 ($InTaO_4$) is much lower as compared with the photocatalysts of the present invention.

EXAMPLE 7

On the metal oxide semiconductor of the formula $In_{0.9}Ni_{0.1}TaO_4$ obtained in Example 2, Pt was supported to obtain Pt-supported semiconductor $Pt/In_{0.9}Ni_{0.1}TaO_4$ (Photocatalyst 7) having Pt content of 0.1% by weight. Pt was supported by an impregnation method. Photocatalyst 7 obtained above was tested for the methanol decomposition efficiency. Thus, Photocatalyst 7 (0.5 g) was suspended in a mixture of 240 ml of pure water and 10 ml of methanol contained in a closed, circulation type catalytic reaction device provided with a reactor cell made of pylex glass. While stirring the suspension using a magnetic stirrer and while circulating the suspension, the reactor cell was irradiated with light from a 300 W xenon lamp through a cut-off filter permitting transmission of light of a wavelength of 420 nm or higher. The gas produced by the reaction was analyzed by gas chromatography. The results are summarized in Table 2. As shown in Table 2, hydrogen was produced continuously at a rate of 146 μmol/h. No oxygen was yielded. This fact indicates that methanol is decomposed by positive holes generated by irradiation of the visible light, while electrons reduce water to yield hydrogen.

EXAMPLE 8

A metal oxide semiconductor having the formula $In_{0.8}Cu_{0.2}TaO_4$ was prepared in a manner similar to that in Example 1 using a required amount of CuO in place of NiO. On the metal oxide semiconductor having the formula $In_{0.8}Cu_{0.2}TaO_4$ was supported Pt in a manner similar to that in Example 7 to obtain Pt-supported semiconductor $Pt/In_{0.8}Cu_{0.2}TaO_4$ (Photocatalyst 8) having Pt content of 1.0% by weight. The thus obtained Photocatalyst 8 was tested for the methanol decomposition efficiency in the same manner as described in Example 7 except that a 400 W high pressure mercury lamp was used in place of the xenon lamp and that the cut-off filter was removed. The results are summarized in Table 2. As shown in Table 2, hydrogen was produced continuously at a rate of 100 μmol/h. No oxygen was yielded. This fact indicates that methanol is decomposed by positive holes generated by irradiation of the UV and visible light, while electrons reduce water to yield hydrogen.

EXAMPLE 9

A metal oxide semiconductor having the formula $In_{0.8}Fe_{0.2}TaO_4$ was prepared in a manner similar to that in Example 1 using a required amount of FeO in place of NiO. On the metal oxide semiconductor having the formula $In_{0.8}Fe_{0.2}TaO_4$ was supported Pt in a manner similar to that in Example 7 to obtain Pt-supported semiconductor Pt/$In_{0.8}Fe_{0.2}TaO_4$ (Photocatalyst 9) having Pt content of 1.0% by weight. The thus obtained Photocatalyst 9 was tested for the methanol decomposition efficiency in the same manner as described in Example 8. The results are summarized in Table 2. As shown in Table 2, hydrogen was produced continuously at a rate of 80 μmol/h. No oxygen was yielded. This fact indicates that methanol is decomposed by positive holes generated by irradiation of the visible light, while electrons reduce water to yield hydrogen.

Comparative Example 2

On $TiO_2$ was supported Pt to obtain Pt/$TiO_2$ (Comparative Photocatalyst 2) having a Pt content of 1% by weight. The thus obtained Comparative Photocatalyst 2 was tested for the methanol decomposition efficiency in the same manner as described in Example 8. The results are shown in Table 2. No photoreactions were found to occur.

TABLE 2

| Photo-catalyst | Composition | Wavelength of Irradiated Light | Gas Production Rate (μmol/h) | |
| --- | --- | --- | --- | --- |
| | | | $H_2$ | $O_2$ |
| 7 | Pt/$In_{0.9}Ni_{0.1}TaO_4$ | >420 nm | 146 | 0 |
| 8 | Pt/$In_{0.8}Cu_{0.2}TaO_4$ | >300 nm | 100 | 0 |
| 9 | Pt/$In_{0.8}Fe_{0.2}TaO_4$ | >300 nm | 80 | 0 |
| Comp. Pc. 2 | Pt/$TiO_2$ | >420 nm | trace | 0 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2001-208937, filed Jul. 10, 2001, inclusive of the specification and claims, are hereby incorporated by reference herein.

What is claimed is:

1. A photocatalyst comprising a metal oxide semiconductor represented by the following formula (1):

$$In_{1-x}M_xAO_4 \qquad (1)$$

wherein M represents a transition metal element, A represents an element belonging to the Group 5a of the Periodic Table and x is a number greater than 0 but smaller than 1; and a co-catalyst of a metal or a metal oxide supported on said metal oxide semiconductor.

2. A photocatalyst as claimed in claim 1, wherein M is at least one metal selected from the group consisting of Cr, Mn, Fe, Go, Ni, Cu and Zn and A is at least one metal selected from the group consisting of Nb, Ta and V.

3. A photocatalyst as claimed in claim 1, wherein said metal oxide semiconductor is represented by the following formula (2) or (3):

$$In_{1-x}Ni_xTaO_4 \qquad (2)$$

$$In_{1-x}Ni_xNbO_4 \qquad (3)$$

wherein x is a number greater than 0 but smaller than 0.5.

4. A photocatalyst as claimed in claim 1, wherein said metal oxide semiconductor has a wolframite crystal structure.

5. A photocatalyst as claimed in claim 1, wherein said metal oxide semiconductor has visible light activity.

6. A photocatalyst as claimed in claim 1, wherein said co-catalyst is selected from Pt, Rh, Ni, nickel oxide, ruthenium oxide and iridium oxide.

7. A method of decomposing a chemical substance, comprising irradiating the chemical substance with light in the presence of a photocatalyst according to claim 1.

8. A method as claimed in claim 7, wherein the chemical substance is water and wherein the water is decomposed to produce hydrogen and oxygen.

9. A method as claimed in claim 7, wherein the chemical substance is a hydrogen-containing material and wherein the hydrogen-containing material is decomposed to produce hydrogen.

10. A method as claimed in claim 7, wherein the chemical substance is a harmful material and wherein the harmful material is decomposed into a harmless substance.

* * * * *

UNITED STATES PATENT AND TRADEMARK OFFICE
CERTIFICATE OF CORRECTION

| | | |
|---|---|---|
| PATENT NO. | : 7,033,566 B2 | Page 1 of 1 |
| APPLICATION NO. | : 10/190574 | |
| DATED | : April 25, 2006 | |
| INVENTOR(S) | : Hironori Arakawa et al. | |

It is certified that error appears in the above-identified patent and that said Letters Patent is hereby corrected as shown below:

On the face of the patent, the address of the Assignee, "Tokyi (JP)" should read -- Tokyo (JP) --

Column 8, line 20 (claim 2, line 3, "Go" should read -- Co --.

Signed and Sealed this

Twelfth Day of December, 2006

JON W. DUDAS
*Director of the United States Patent and Trademark Office*